United States Patent
Bury et al.

(10) Patent No.: US 8,463,845 B2
(45) Date of Patent: Jun. 11, 2013

(54) MULTIMEDIA EDITING SYSTEMS AND METHODS THEREFOR

(75) Inventors: Craig Bury, Hook (GB); Alexander Sharp, Ipswich (GB); Stephen Russell, Midgham (GB)

(73) Assignee: ITXC IP Holdings S.a.r.l., Luxembourg (LU)

( * ) Notice: Subject to any disclaimer, the term of this patent is extended or adjusted under 35 U.S.C. 154(b) by 451 days.

(21) Appl. No.: 12/750,171

(22) Filed: Mar. 30, 2010

(65) Prior Publication Data

US 2011/0246554 A1 Oct. 6, 2011

(51) Int. Cl.
G06F 15/173 (2006.01)

(52) U.S. Cl.
USPC .......................................... 709/203

(58) Field of Classification Search
USPC .................................. 709/203, 217
See application file for complete search history.

(56) References Cited

U.S. PATENT DOCUMENTS

| | | | |
|---|---|---|---|
| 5,517,652 A | 5/1996 | Miyamoto et al. |
| 6,029,194 A | 2/2000 | Tilt |
| 6,115,646 A | 9/2000 | Fiszman et al. |
| 6,122,633 A | 9/2000 | Leymann et al. |
| 6,373,480 B1 | 4/2002 | Won |
| 6,539,163 B1 | 3/2003 | Sheasby et al. |
| 6,549,922 B1 | 4/2003 | Srivastava et al. |
| 6,871,231 B2 | 3/2005 | Morris |
| 7,080,124 B1 | 7/2006 | Shankar |
| 7,194,527 B2 | 3/2007 | Drucker et al. |
| 7,240,324 B2 | 7/2007 | Casati et al. |
| 7,401,097 B1 | 7/2008 | Baer et al. |
| 7,424,717 B2 | 9/2008 | Blevins |
| 7,428,495 B2 | 9/2008 | Dhar et al. |
| 7,509,321 B2 | 3/2009 | Wong et al. |
| 7,512,885 B2 | 3/2009 | Walsh et al. |
| 7,590,259 B2 | 9/2009 | Levy et al. |

(Continued)

FOREIGN PATENT DOCUMENTS

| | | |
|---|---|---|
| EP | 1851644 A2 | 11/2007 |
| EP | 1851682 A2 | 11/2007 |

(Continued)

OTHER PUBLICATIONS

International Search Report and Written Opinion, dated Apr. 26, 2011 of International Application No. PCT/US10/029388, filed: Mar. 31, 2010.

(Continued)

*Primary Examiner* — David Eng
(74) *Attorney, Agent, or Firm* — Kaplan Breyer Schwarz & Ottesen, LLP

(57) ABSTRACT

A distributed system and methods for web-based multimedia content including a global media hub (GMH) server computer (500) and a multiplicity of remote media asset node (MAN) server computers (510, 520, 530, 540, 550) and client computer terminals (515, 525, 535, 536, 537, 545, 555), with the client or customer computers being constructed and configured for network-based coupling to at least one of the MAN server computers for editing a browse copy of the MMC stored at the MAN. The GMH server computer includes processing component, memory for storage of all the metadata, and includes software operable thereon for orchestrating the processes that act on the MMC and metadata, including the operations and actions that are initiated by the client computer terminals for acting on the MAN-based MMC.

9 Claims, 8 Drawing Sheets

U.S. PATENT DOCUMENTS

| | | | |
|---|---|---|---|
| 7,668,869 B2 | 2/2010 | Weinberger et al. | |
| 7,716,191 B2 | 5/2010 | Blumenau et al. | |
| 2001/0004417 A1 | 6/2001 | Narutoshi et al. | |
| 2002/0010803 A1 | 1/2002 | Oberstein et al. | |
| 2002/0069217 A1 | 6/2002 | Chen et al. | |
| 2002/0088000 A1 | 7/2002 | Morris | |
| 2002/0116716 A1 | 8/2002 | Sideman | |
| 2002/0170035 A1 | 11/2002 | Casati et al. | |
| 2003/0061266 A1 | 3/2003 | Ouchi | |
| 2003/0236677 A1 | 12/2003 | Casati et al. | |
| 2004/0143604 A1 | 7/2004 | Glenner et al. | |
| 2004/0220965 A1 | 11/2004 | Harville et al. | |
| 2004/0237032 A1 | 11/2004 | Miele et al. | |
| 2005/0015293 A1 | 1/2005 | Henn et al. | |
| 2005/0055664 A1 | 3/2005 | Kloppmann et al. | |
| 2005/0154741 A1 | 7/2005 | Hebert et al. | |
| 2005/0193016 A1 | 9/2005 | Seet et al. | |
| 2006/0085412 A1 | 4/2006 | Johnson et al. | |
| 2006/0106814 A1 | 5/2006 | Blumenau et al. | |
| 2006/0149781 A1 | 7/2006 | Blankenship | |
| 2006/0161635 A1 | 7/2006 | Lamkin et al. | |
| 2006/0241997 A1 | 10/2006 | Bhatawdekar et al. | |
| 2006/0259852 A1 | 11/2006 | Upendran et al. | |
| 2007/0028172 A1 | 2/2007 | Greer et al. | |
| 2007/0044010 A1 | 2/2007 | Sull et al. | |
| 2007/0050834 A1 | 3/2007 | Royo et al. | |
| 2007/0061324 A1 | 3/2007 | Morris | |
| 2007/0162854 A1 | 7/2007 | Kikinis | |
| 2007/0162953 A1 | 7/2007 | Bolliger et al. | |
| 2007/0233680 A1 | 10/2007 | Carlson et al. | |
| 2007/0233740 A1 | 10/2007 | Nichols et al. | |
| 2008/0086456 A1 | 4/2008 | Rasanen et al. | |
| 2008/0123976 A1 | 5/2008 | Coombs et al. | |
| 2008/0126388 A1 | 5/2008 | Naaman | |
| 2008/0126953 A1 | 5/2008 | Davidson et al. | |
| 2008/0229391 A1 | 9/2008 | Bimson et al. | |
| 2009/0012987 A1 | 1/2009 | Kaminsky et al. | |
| 2009/0025063 A1 | 1/2009 | Thomas | |
| 2009/0063540 A1 | 3/2009 | Mattox et al. | |
| 2009/0150947 A1 | 6/2009 | Soderstrom | |
| 2009/0182610 A1 | 7/2009 | Palanisamy et al. | |
| 2009/0193096 A1 | 7/2009 | Boyer et al. | |
| 2009/0327002 A1 | 12/2009 | Chapman et al. | |
| 2010/0014826 A1 | 1/2010 | Kojo et al. | |
| 2010/0058354 A1* | 3/2010 | Fein et al. | 719/313 |
| 2010/0095222 A1 | 4/2010 | Tevelev et al. | |
| 2010/0262710 A1* | 10/2010 | Khatib et al. | 709/231 |
| 2010/0287163 A1 | 11/2010 | Sridhar et al. | |
| 2011/0029883 A1* | 2/2011 | Lussier et al. | 715/738 |
| 2011/0246555 A1 | 10/2011 | Hedges et al. | |
| 2011/0246892 A1 | 10/2011 | Hedges et al. | |
| 2011/0246900 A1 | 10/2011 | Hedges et al. | |
| 2011/0276881 A1* | 11/2011 | Keng et al. | 715/723 |
| 2012/0011442 A1* | 1/2012 | Fay et al. | 715/723 |
| 2012/0030550 A1* | 2/2012 | Chin et al. | 715/202 |
| 2012/0078691 A1* | 3/2012 | Tsai et al. | 705/14.4 |

FOREIGN PATENT DOCUMENTS

| | | |
|---|---|---|
| EP | 1851973 A2 | 11/2007 |
| JP | 4259936 A | 9/1992 |
| JP | 2008510327 A | 4/2008 |
| JP | 2009-507432 A | 2/2009 |
| JP | 2009507432 A | 2/2009 |
| KR | 1020010100373 A | 11/2001 |
| KR | 1020020018445 A | 3/2002 |
| KR | 20070006905 A1 | 1/2007 |
| KR | 20090061664 A | 6/2009 |
| WO | 2006009663 A1 | 1/2006 |
| WO | 2008093363 A2 | 8/2008 |
| WO | 2008108759 A1 | 9/2008 |

OTHER PUBLICATIONS

International Search Report and Written Opinion, dated Apr. 1, 2011 of International Application No. PCT/US10/029415, filed: Mar. 31, 2010.

International Search Report and Written Opinion, dated Apr. 28, 2011 of International Application No. PCT/US10/029421, filed: Mar. 31, 2010.

International Search Report and Written Opinion, dated Mar. 31, 2011 of International Application No. PCT/US10/029424, filed: Mar. 31, 2010.

Stephen, Alvesteffer; "Related U.S. Appl. No. 12/750,638 Office Action Sep. 12, 2012", Publisher: USPTO; Published in U.S.

Stephen, Alvesteffer; "Related U.S. Appl. No. 12/750,645 Office Action Sep. 18, 2012", Publisher: USPTO; Published in U.S.

Edward J. Kim; "Related U.S. Appl. No. 12/750,652 Office Action Jan. 1, 2013", Publisher: USPTO; Published in U.S.

* cited by examiner

MULTIMEDIA EDITING SYSTEMS AND METHODS THEREFOR

BACKGROUND OF THE INVENTION

1. Field of the Invention

The present invention relates to systems and methods for editing multimedia content, and more particularly, to systems and methods for editing multimedia content, including on demand, web-services based editing of multimedia content over a distributed system connected by a network providing media as a service (MaaS).

2. Description of the Relevant Art

It is generally known in the art to provide video editing systems and methods having a server computer and remote user terminals wherein content stored on the server computer is edited via the remote user terminals, based on inputs from users active thereon. It is also generally known in the art to manage, edit, and create digital content such as text, email, music, video, digital images, and combinations thereof from remote terminals through a network, such as the Internet, to a server computer. While the speed and bandwidth of data communication over the Internet has increased over time, large content items, such as streaming video, animation, and full-length movies require higher download and upload times than other digital content. It is also known to provide video editing systems that provide for multiple remote users to access the same content from a server computer and content database via a network, such as the Internet; version management systems and methods are also known.

By way of example of relevant art documents:

US Patent Application Publication No. 20100014826 for Video editing system, video editing server, and communication terminal published on Jan. 21, 2010; describes a video editing platform and server that allows multiple terminals to connect to the server to edit the same file at the same time, including editing on the server without loading the terminals, wherein the terminals transmit commands from a predetermined set to the server, which are then processed by the server to effect editing of a video file.

US Patent Application Publication No. 20090150947 for Online search, storage, manipulation and delivery of video content published on Jun. 11, 2009; describes a system that includes a central hub for management of user's video content, allowing users to add, delete, view, categorize, search, send, receive, edit, and comment on stored video content.

US Patent Application Publication No. 20020116716 for Online video editor published on Aug. 22, 2002; discloses methods running on a server operating on a network having a client/server architecture to allow a client control over a video editor program running on the server, including a video editing program running on a server, allowing users to choose media available on the server or upload media to the server and allowing users to control the video editor program to create a video file using a real time control panel view (from a remote terminal user interface).

SUMMARY OF THE INVENTION

The present invention relates to multimedia content editing and creation of derivative works using systems including at least one remote server computer associated with at least one client for editing and creating multimedia content, the at least one remote server computer constructed and configured in electronic communication over a network to a global media hub server computer having software operable thereon to control the orchestration of processes that act on the multimedia content.

It is an object of this invention to provide methods for editing multimedia content (MMC) and creating derivative works from multimedia content including the steps of: (a) providing a system including at least one remote media asset node (MAN) including MAN server computer associated with at least one client for editing multimedia content (MMC), the at least one remote MAN constructed and configured in electronic communication over a network to a global media hub (GMH) having GMH server computer(s) having a processor, a memory, and software operable thereon to control the processes that act on the MMC at the MANs, the GMH operable for storing the metadata associated with the MMC, and the MANs operable for storing the MMC; (b) from a user interface on a display coupled to the at least one remote MAN associated with a client site and positioned in geographic proximity to the client site; (c) editing the MMC via a client web-based user interface (UI); and (d) the GMH controlling all workflows at the MANs.

It is also an object of this invention to provide a system for editing multimedia content (MMC) including at least one remote media asset node (MAN) having MAN server computer(s) associated with at least one client for editing MMC, the at least one remote MAN constructed and configured in electronic communication over a network to a global media hub (GMH) including GMH server computer(s) having software operable thereon to control the orchestration of processes that act on the MMC, and the GMH operable for storing unique identifiers as metadata associated with the MMC and the GMH operable for controlling all MAN services acting on the MMC, with the MMC being stored at the MANs; a browser-based user interface on a display at the client coupled to the at least one remote MAN via the network, the MAN(s) being associated with a client and positioned in geographic proximity to the client, operable for acting on MMC at the MAN(s) for editing the MMC over the distributed system.

It is also an object of this invention to provide a system and method for a media as a service (MaaS) to at least manipulate and distribute multimedia content (MMC) a browser-based user interface with the associated trans-coding, storage and metadata residing or being performed on a web platform. Advantageously this MaaS system and method provides on-demand services to MAN locations that have demand production users who need to share content with their customers and suppliers; demand from broadcast users looking to exploit the benefits of distributed collaborative working; demand from post production users who need to share content with their customers and suppliers; and opportunity users of the platform, or aggregators who can lease or rent the platform, for the owner of purchased rights and reformats for region.

These objects and other aspects of the present invention will become apparent to those skilled in the art after a reading of the following detailed description of the preferred embodiments of the present invention, when considered with the drawings, as they support the claimed invention.

DETAILED DESCRIPTION OF THE INVENTION

Figure 1:
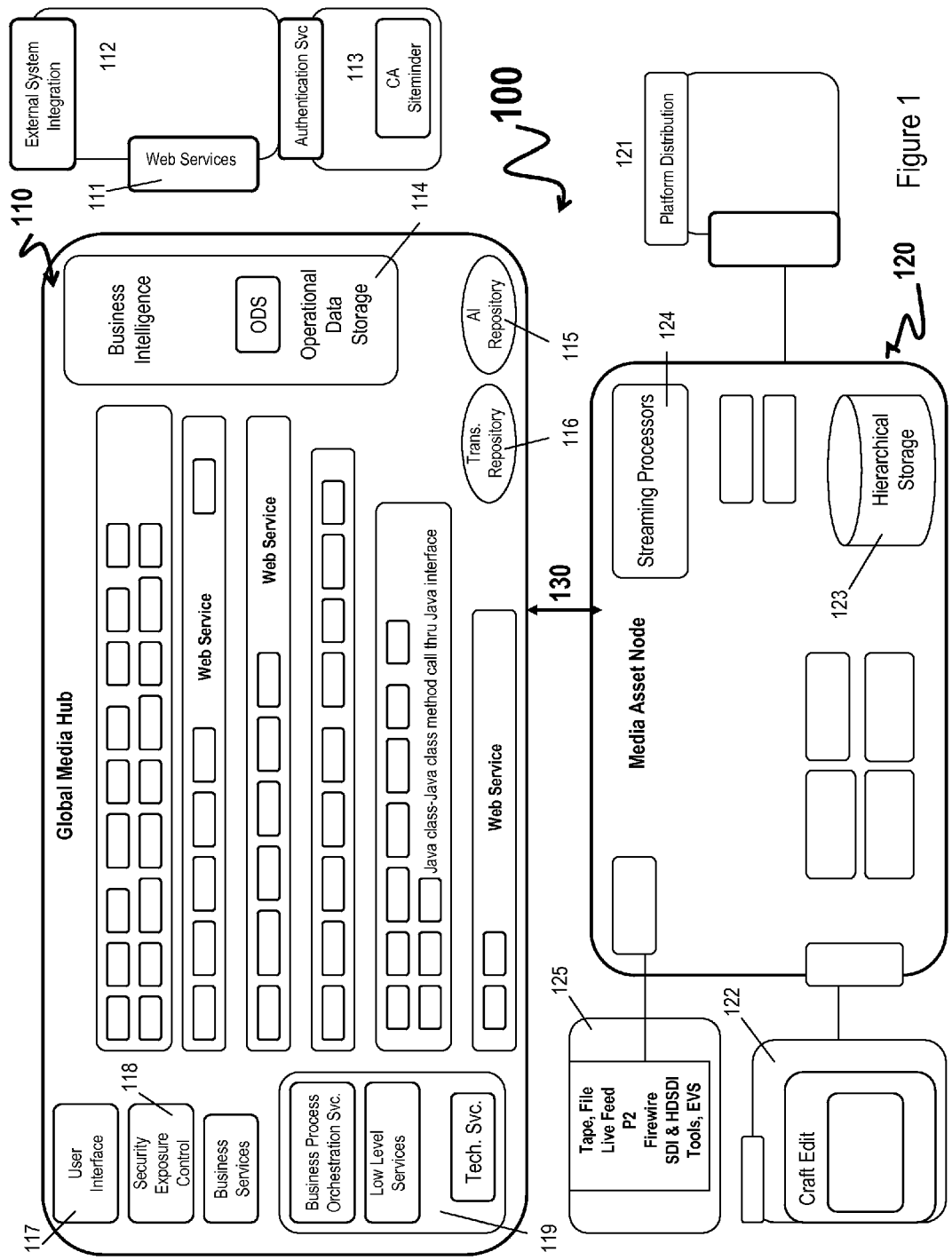
FIG. 1 is a schematic diagram illustrating one embodiment of the present invention, showing the global media hub server computer and components thereof, the media asset node (MAN) server computer and components thereof, and web services provided thereby, via an Internet connection between the remotely located GMH and MAN server computers, for providing the system and methods according to the present invention.

Referring now to the drawings in general, the illustrations are for the purpose of describing a preferred embodiment of the invention and are not intended to limit the invention thereto.

The present invention provides systems and methods for editing multimedia content, and more particularly, to systems and methods for editing multimedia content, including remote editing terminals in electronic communication over a network with a server computer that address and overcome problems associated with prior art online video editing systems and methods. Examples of problems associated with prior art include slow download and real-time editing video content remotely from the server computer whereupon the video content is stored. Also, problems associated with content digital rights management tracking exist in the prior art, since metadata associated with the video content is not connected with the content after editing or derivative works created from the original video content components (or subcomponents) that were included in the video content itself.

In embodiments and the following examples and figures illustrating the present invention systems and methods, there are two main elements operable in concert over a distributed network to transform multimedia content into edited and/or repurposed content: a global media hub (GMH) and at least one media asset node (MAN). The global media hub (GMH) is the core of the system, having the core applications thereon that drive workflows, orchestrate services, manage metadata, and provide secure and controlled access to the multimedia content stored on the GMH for editing and repurposing. The orchestration layer provides for a set of workflows or work orders to be organized in a series of different processes and/or tasks to provide an end-to-end workflow for the MMC editing services. The GMH assembles low level services at the MAN in a logic-based order that is predetermined, or created within a work order based on client inputs. Examples of work orders include the functions of ingest and transcode, and subcomponents of work orders. Examples of orchestrated services include: import process>grab essence>create browse copy>create thumbnails or series of thumbnails>save in storage; publish content from deep storage>transcode>move to publishing point via FTP.

The GMH includes at least one GMH server computer having a memory, a processor, input/output devices, a power supply, all constructed, configured and coupled to be operable for software installed thereon, and for interactivity via a network for storing, controlling, sending and receiving data, as is known to one of ordinary skill in the art, and further includes an user interface associated with the GMH controller server computer and database(s) having multimedia content (MMC) and corresponding metadata associated with the MMC stored thereon, and software installed and operable on the GMH server computer functioning to control the orchestration of processes that act on the MMC and corresponding metadata, which are stored in memory or data storage module(s) in the GMH. These processes that act on the MMC include activities and services that act on the MMC and corresponding metadata, including but not limited to Software as a Service (SaaS)-based services initiated from at least one remote server computer (MAN) that are distributed geographically remotely from the GMH and coupled thereto via network connection, preferably an Internet connection. By contrast to the prior art, the present invention advantageously provides all MMC storage, including storage of corresponding metadata for all MMC, at the MANs, including a browse copy of the original MMC and edited MMC, but provides an unique identifier for each MMC or essence, which is exclusively and always stored at the GMH. Advantageously, storing the MMC at the MAN server(s) located more proximal to the client computer terminal(s) than the GMH itself, accelerates processing services time and workflow over the network, since it provides web-browser-based operations and editors allowing for remote client-based editing operations via the MAN server(s) over broadband Internet connection therebetween.

It is the MAN-based MMC, which is acted upon for editing by the client, including its extraction of the browse copy from the MAN for editing, such as sending the MMC to Craft Editor through a workorder; and then sending edited MMC from Craft Editor, wherein the edited MMC is uploaded to its destination in a hot folder and then received into the system for storage at the MAN, if and only if a corresponding metadata to the edited MMC is included with the edited MMC, so that the edited MMC metadata is received and stored centrally on the GMH. Thus, the separation of the MAN and the GMH advantageously provides flexibility of hosting the content-intensive operations at the MAN, which is closer to the client location than the GMH. The MAN is located typically either at or proximal to a client site, due to bandwidth requirements for transfer and/or management of the MMC. In preferred embodiments of the present invention, a single GMH, which is preferably centrally located for the system, is operable to support a multiplicity of distributed MANs, which further provide for MMC storage proximal to the client for editing to be managed and controlled by the GMH through a single user interface, since it is the GMH that controls and manages the core operations and services via the network through the distributed MANs.

The MMC comprises audio and/or video material, clips, frames, a series of frames, text, images, and combinations thereof, and from components or elements, subcomponents or sub-elements thereof. Also MMC may further include, scripts, documents, titles, interactive, executables, HTML, or anything that is associated with the content or essence to be edited, repurposed and/or managed within the system.

Figure 4:
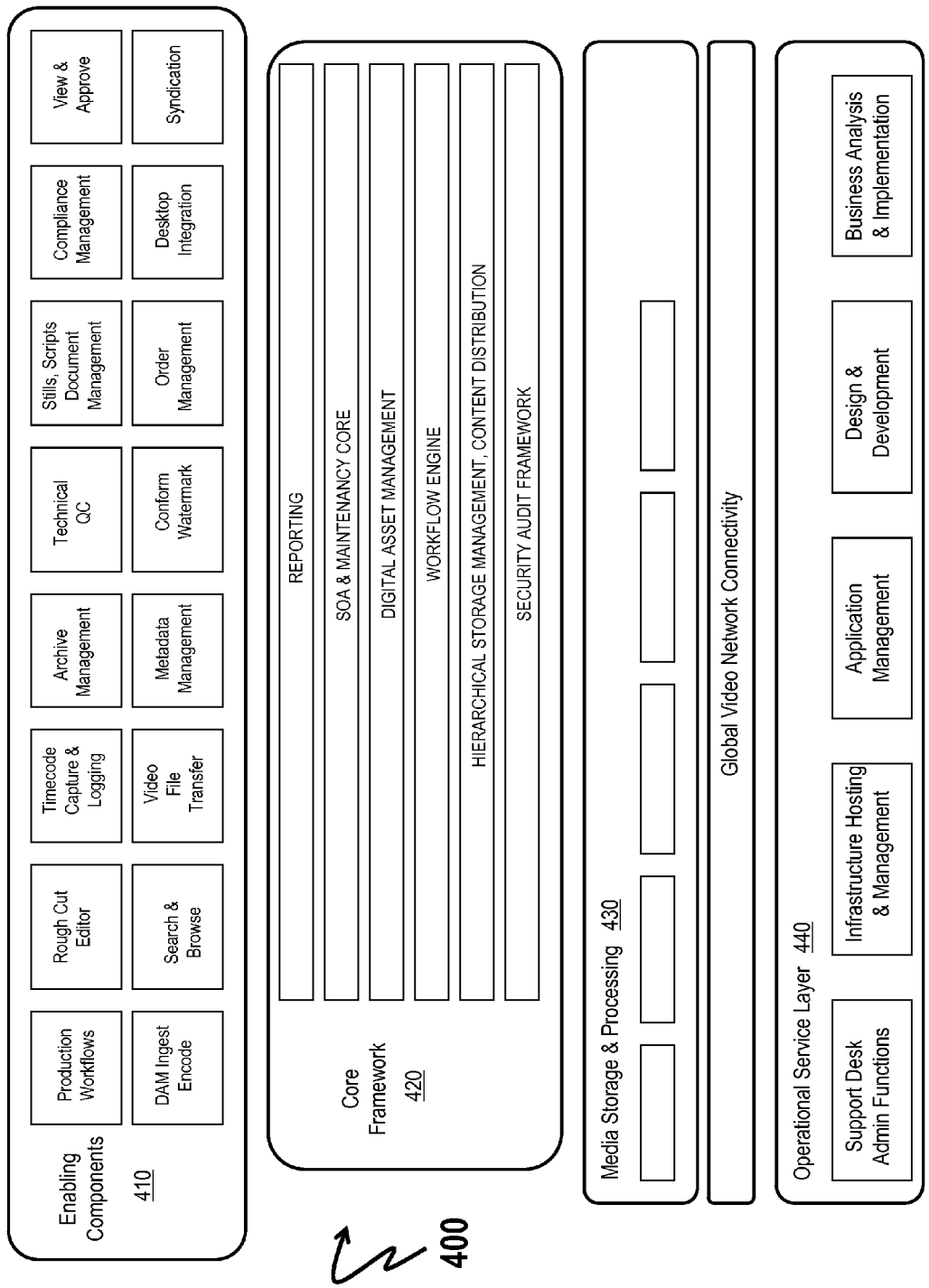
FIG. 4 is a schematic diagram illustrating functional components of the systems and methods of the present invention, showing global media hub server computer enabling components, core framework, media storage and processing, and an operational services layer.
Figure 5:
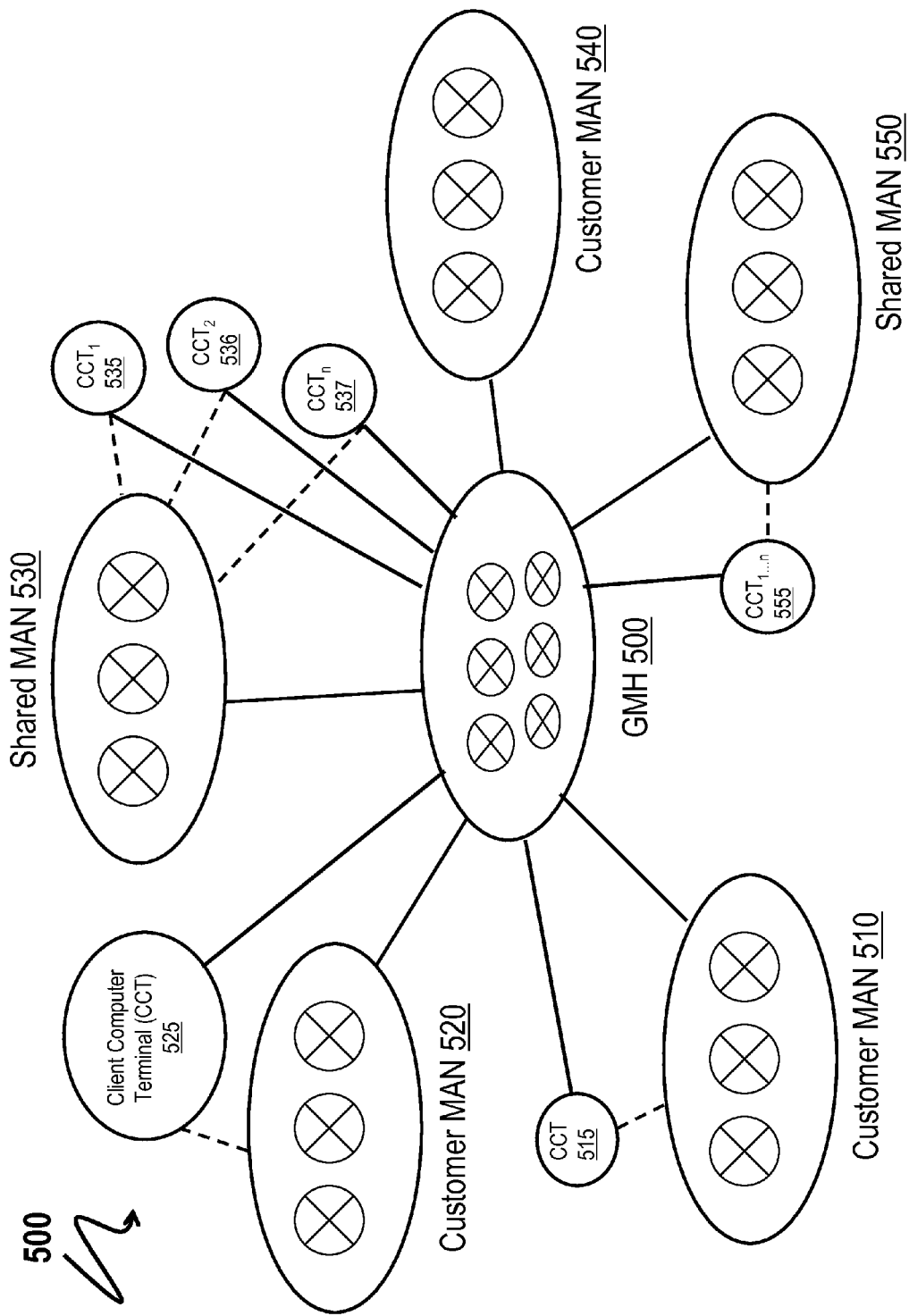
FIG. 5 is another schematic diagram illustrating a distributed system having a global media hub server computer and a multiplicity of remote media asset node (MAN) server computers and client or customer computers or terminals.
Figure 6:
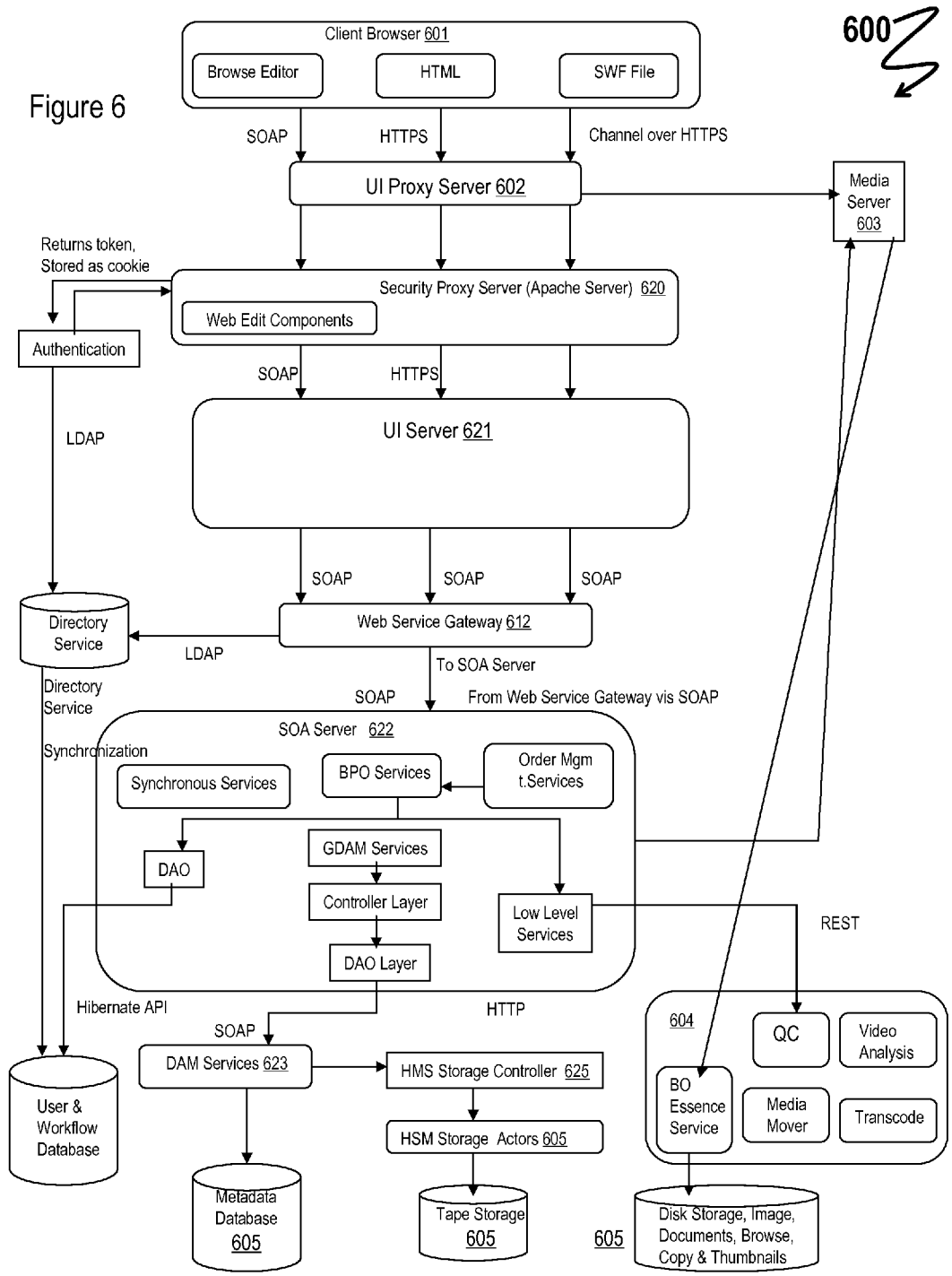
FIG. 6 is a flow diagram illustrating the workflow and relational activities between the global media hub (GMH), the media asset node (MAN), client browser on a client computer, and external activities and/or data sources.

As illustrated in the FIGS. 1 through 8, in particular in FIG. 6, the user interface control is situated and controlled within the GMH; the user client login is operable via the Internet or other network having a direct connection from the client to the GMH; the user login function is operable via a URL to the platform of the system. The user request is then directed a UI proxy server that resides within the MAN, which redirects to the GMH via the connection between the MAN and the GMH, which serves up the UI pages via that connection back to the user at the client; the user interacts remotely from the GMH through the web browser UI at the client for searching, interacting with the GMH; if the user from the client is only acting on the metadata then that activity is directed to the GMH only; however, if the user at the client includes activities of editing MMC or essence and doing workflow, then the system and methods of the present invention automatically redirect to the MANs, so that all workflow-based activity occurs at the MAN. So then to ingest content, the client UI displays the directory that sits in the MAN to the user via the GMH; all loading of MMC for editing or repurposing is done on the MAN. Thus the processes of the system appear to be transparent to the user, with the control of the MAN for the user at the client via the GMH, as illustrated in FIG. 6. The messaging between the GMH and the MAN(s) controls the services that sits within each of the MANs. An unique ID or metadata corresponding to each MMC is automatically generated when MMC is introduced to the system, or edited and repurposed, and the metadata is stored at the GMH for the entire the process, even though the MMC resides in data storage at the MANs; this separation of the metadata storage at the GMH and controlled access by the GMH, with all MMC storage residing with the MANs, streamlines editing processes and makes them more efficient, since the content is stored proximal to the client at the MANs, while the control of MMC and metadata storage are separately and centrally done.

FIG. 1 is a schematic diagram illustrating one embodiment of the present invention, showing the system components (100), a global media hub server computer (110) and components thereof, the media asset node (MAN) server computer (120) and components thereof, and web services provided thereby, via an Internet connection (130) between the remotely located GMH and MAN server computers, for providing the system and methods according to the present invention. The MAN server computer further includes a platform distribution (121); a craft edit module (122) that provides for nonlinear editing systems, such as taking a rough cut within the system of original MMC in a timeline or sequence but selectively using portions of the MMC based on client inputs; hierarchical storage module (123) the browse copies and thumbnails on disc, and tape-based storage of the high resolution; streaming processors (124), and data storage for uploading content (125).

Regarding metadata, it is not stored at the MAN, it's only referential at the MAN. The metadata tag locking and time-line-based metadata is stored at the GMH, which is centralized; centralized metadata management, while essence storage and editing are provided at the MANs, which can sit anywhere in the system. The main services within the MAN support ingest of the content, QC, transcode, storage of the essence, publishing of the essence, craft edit integration within the MAN (send the assets out and then back in). The metadata is considered in more than one category: a general metadata, and a temporal metadata. The general metadata includes information about the MMC asset itself, technical information about the physical file, and/or business data; this general metadata is multilayered, and includes non-time-code-based information, by way of example and not limitation, metadata associated with the program overall, individual episodes, actors, transmission dates, etc. The temporal metadata includes information about and is associated to timecode within the file or piece of essence or MMC.

The GMH further includes at least one server computer upon which web services elements (111) are operable, including external system integration module (112), for automatically managing integration between all system components external to the GMH, and an authentication service module (113). GMH and its corresponding server computer(s) further include a business intelligence module (114) including operational data storage thereon; an AI repository (115), a transactional repository (116), a user interface (117), a security exposure control module (118), and a core orchestration and service layer (119) further including the business process orchestration service module, low level services module, and technical services module; all modules and layers of the GMH are constructed and configured to be operable with the software platform controlling and operating the GMH as the controlling core of the systems and methods of the present invention, and which further include the metadata, which provides unique identifiers (IDs) for each MMC within the system, including original MMC, edited MMC that is injected into the system, including sub-componential MMC-related metadata, which indicates the source of the original MMC sub-component, even if it is edited and repurposed in whole or in part, and included in a new derivative work; importantly, this metadata stored at the GMH persists with the existence of the original MMC residing at the MAN(s).

Figure 2:
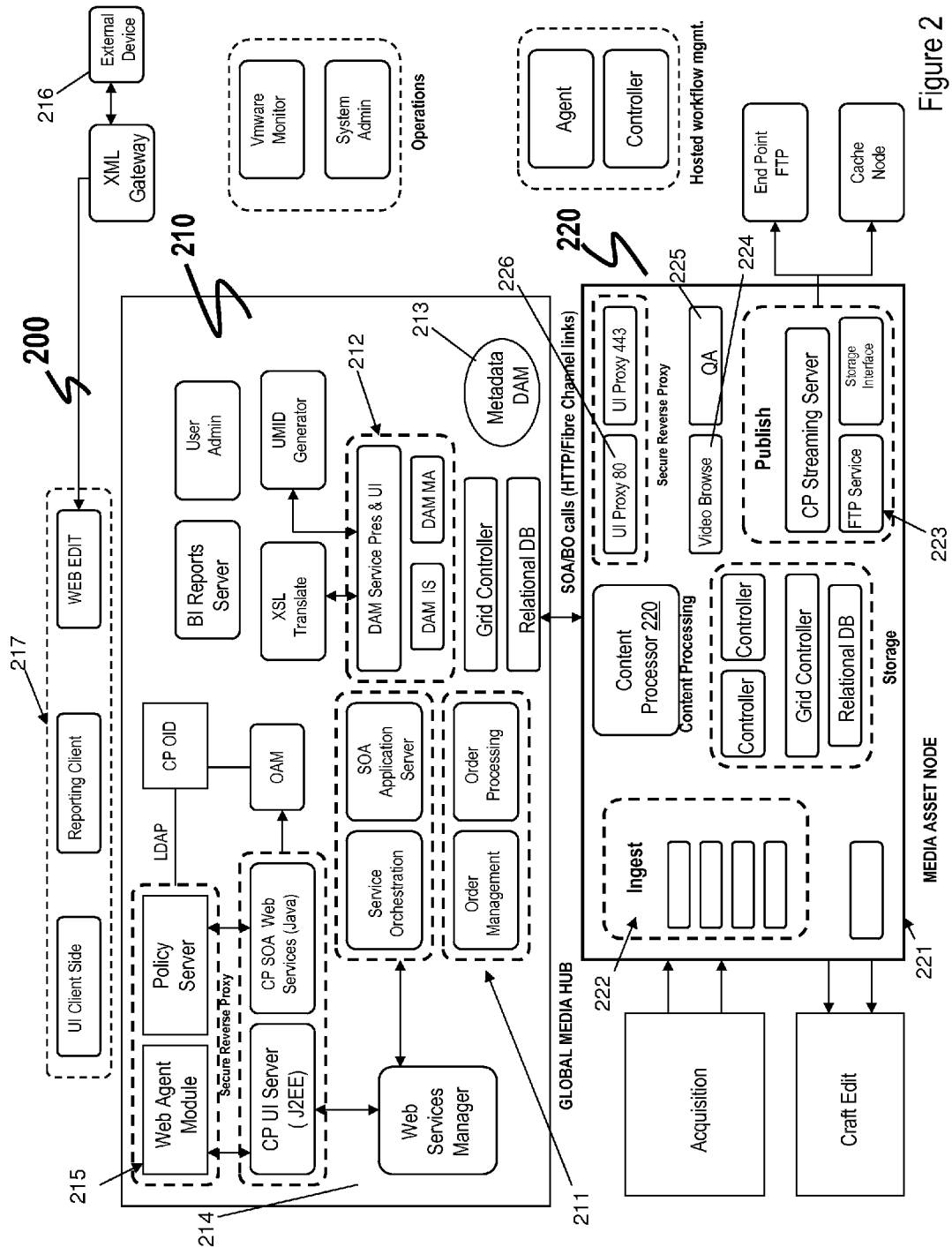
FIG. 2 is a schematic flow diagram illustrating one embodiment of the present invention, showing the global media hub server computer and components thereof, the media asset node (MAN) server computer and components thereof, and web services provided thereby, via an Internet connection between the remotely located GMH and MAN server computers, for providing the system and methods according to the present invention.

FIG. 2 is a schematic flow diagram illustrating components of the present invention, generally referenced (200), showing the global media hub (210), including GMH server computer(s) and components thereof, the media asset node (MAN) (220) including MAN server computer and components thereof, and web services provided thereby, via an Internet connection between the centrally located GMH and remotely distributed MAN(s) in a substantially hub-and-spoke relationship, with the MANs being located proximal the client, for providing the system and methods according to the present invention. Process flow within the GMH includes the business intelligence server layer (211) including order management and order processing functionality, as well as service orchestration and service oriented architecture (SOA) application server, which flows in connection and coupled with a business orchestration service presentation and user interface (UI) collectively referenced (212), Digital Asset Management (DAM) information services and management architecture, all driven by a grid controller and RAC, in communication with the DAM metadata (213), for MMC management at the GMH, thereby providing a centralized database at the GMH including all metadata and the unique IDs they represent for all MMC, and a MMC operations log.

In embodiments of the present invention, the communication between the GMH and the at least one MAN, or multiplicity of MANs, occurs over a network (such as the Internet, or a direct network) through web service calls, which provides for scalability by modular, component-based distributed MANs for a single GMH, constructed and configured in a hub-and-spoke architectural framework providing for channel management and workflow prioritization, wherein the messages within the system pass between the distributed MANs and the substantially central GMH. Furthermore, the system handles multi-tenancy via a hierarchical model of Domain>Business>User>Roles. Thus, in the case of multi-tenancy, multiple businesses or clients can be assigned to a single domain, wherein each business or client has its own set of users, and each set of users has its own roles, thereby limiting access to the MMC and corresponding metadata within the GMH. So then the system architecture functions on a multi-tenant environment where one instance is able to support multiple organizational content with appropriate security access controlled by the GMH. An indexing service provides information about the distributed MMC assets residing at the MANs within the system, which allows for streamlined editing and repurposing by the client, without affecting the GMH-based metadata directly. Preferably, the GMH-based metadata is locked and not editable.

The business orchestration layer controls the lower level services within the MAN or provided by the MAN, to execute a series of MMC processing activities in a user-defined order or sequence, based upon inputs received through the client computer for operating on the MMC at the MAN level. The business orchestration layer advantageously allows for manipulation and distribution of content across the on-demand, web-based system. GMH also houses a secure reverse proxy process between the CP UI server and CP SOA web services (214) that flow to a web agent module and policy server (215). An external device (216) operates on the system via web services, functional for connecting the remote client to the GMH through a UI client side, reporting client and web edit module (217). In methods of the present invention, the system is operable via service orchestration architecture (SOA)/BO calls via network connection, preferably the Internet, coupling the GMH with the MAN. The MAN further includes components constructed and configured to be operable for providing processes of ingest (222) of MMC, content processing (221), publishing (223), video or MMC browsing (224), quality assurance (QA) (225), and providing a secure reverse proxy (226). MAN functionality includes importing or injecting MMC in a browse copy MMC format (which becomes the MAN-based MMC) over a distributed network from the GMH onto the platform for editing by the client; transitory storage of MMC from the GMH for editing; transcoding for changing MMC from one format to another format; quality control; and publishing. To accelerate processing, the MAN-based MMC may be a low resolution copy of the "original" high resolution MMC stored at the MAN (illustrated in FIG. 6), and may also include a corresponding lower resolution copy of the MMC for storage at the MAN and used for editing by the client for a predetermined period while editing processing are ongoing (or longer if the MMC is particularly useful to the end client). The client works off the browse copy at the MAN, and at disc storage a high resolution essence is provided on page storage after the editing on the browse copy (see FIG. 6).

Figure 3:
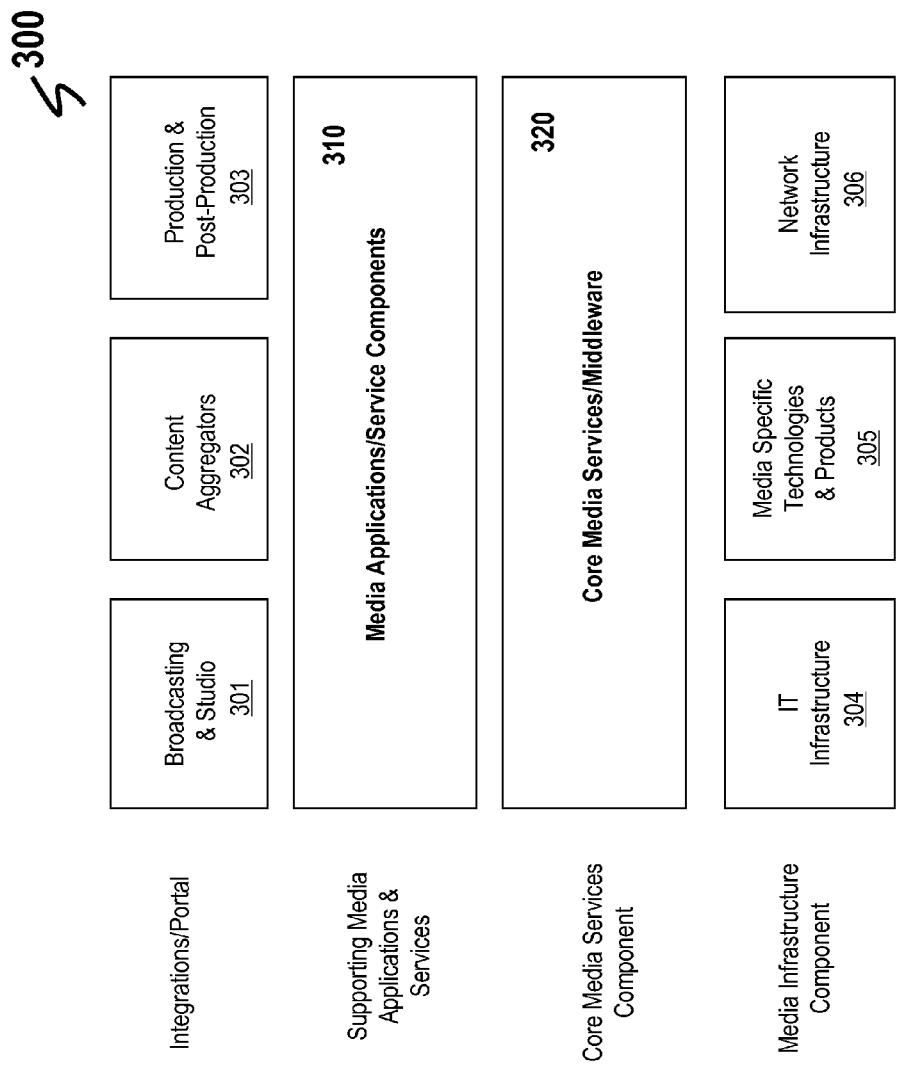
FIG. 3 is a schematic diagram illustrating components of the system for providing web-based multimedia editing and media asset storage, according to an embodiment of the present invention.

FIG. 3 represents a schematic diagram illustrating select components of the system, generally referenced (300), for providing web-based multimedia editing and media asset storage, according to an embodiment of the present invention. These select components include, at an integrations/portal level: broadcasting and studio, content aggregators, production and post-production components; at a supporting media applications and services level: media applications and services components (310), which further include search and retrieval business services, editorial compliance and EDL, library management applications and services, content formatting and repurposing, and order management and electronic fulfillment; at a core media services component level: core media services and middleware (320), with the metadata storage and management centrally on the GMH while MMC is stored remotely on the MANs, content processing operations, such as for example, transformation, packaging and encoding, content processing scheduling and coordination, media transformation content flows, i.e., ingest and library management, content manipulations and packaging; and, at a media infrastructure level: IT infrastructure; media specific technologies and products; networking infrastructure.

FIG. 4 is a schematic diagram illustrating functional components (generally referenced (400)) of the systems and methods of the present invention, illustrating tiered layers including global media hub and its enabling components (410) including server computer(s), core framework (420), media storage and processing (430), and an operational services layer (440). The enabling components layer (410) includes the following modules: production workflows, ingest encode processing, rough cut editor, search and browse, video (or MMC) file transfer, timecode capture and logging, archive management, metadata management, technical quality control (QC), conformance & watermark, stills/scripts/document management, order management, compliance management, desktop integration, view and approve, and syndication. The core framework layer (420) includes the following modules: reporting, SOA and multi-tenancy core, digital asset management, workflow engine, hierarchical storage management, content distribution, security and audit framework. The media storage and processing layer (430) includes the following modules: archive storage, cache media storage, media movement & streaming, processing & AI, and desktop tool integration. The operational service layer (440) includes the following modules: support desk admin functions, infrastructure hosting and management, application management, design and development, and business analysis and implementation.

FIG. 5 is another schematic diagram illustrating a distributed system having a global media hub and a multiplicity of remote media asset nodes (MANs) and client or customer MAN computers located proximal the MANs for editing and repurposing the content or MMC stored on the MANs, with the client or customer computers being constructed and configured for network-based coupling to at least one of the MAN server computers and/or GMH via a user interface, wherein the MANs are positioned in closer proximity to—closer distance to—the client computer(s) than the distance between the client computer and the GMH. As shown, the GMH server computers includes processing components, memory for storage of the MMC-corresponding metadata, and includes software operable thereon for orchestrating the processes that act on the MMC stored at the MANs and metadata stored at the GMH, including the operations and actions that are initiated by the client computer terminals via browser UI and network connection. The GMH (500) includes the main controller server for all of the MAN server computers (510, 520, 530, 540, 550) and for controlling and orchestrating the processes that act on the MMC and metadata, including actions by the MAN for importing and storing a browse copy of the MMC proximal to the client terminals (515, 525, 535, 536, 537, 545, 555) for editing thereby, in addition to the MAN storage of the original MMC. The GMH and its server computers (500) maintain security, holds the metadata, controls the workflows for activities on the MMC, and manages integration processes. Also as shown, each of the shared MAN (530, 550) and customer MAN (510, 520, 540) server computers includes processing components (511, 521, 531, 541, 551), a cache storage component (512, 522, 532, 542, 552), and an archive storage component (513, 523, 533, 543, 553), respectively; collectively within each MAN server computer, these components are constructed and configured for performing the processes on the MMC stored locally on the respective MAN server computers, including the functions of importing, storing, streaming, editing, manipulating, and combinations thereof.

FIG. 6 shows a flow diagram illustrating the workflow and processes of the system, generally referenced (600), according to an embodiment of the present invention, and relational activities between the global media hub (GMH) (including components or functions 620, 621, 622, 612, 623, 624, 625), the media asset node (MAN) (including components or functions 602, 603, 604, 605, 606, 607), client browser (601) on a client computer, and external activities and/or data sources. As shown, the workflow request initiates from a client browser (601) including a browse editor module, HTML-based interface, and SWF file modules, which communicate via SOAP, HTTPS, and over HTTPS, respectively, to a UI proxy server (602) residing with the MAN relating to that client. The UI proxy server passes the request by the client through the web service gateway (612) via the GMH-controller via a security proxy server (620), which further includes web edit components, the UI server (621), ultimately to the GMH SOA server (622). The UI proxy server also directs the process flow for essence stored within the MAN to the media server (603), which also resides within the MAN.

Also illustrated in FIG. 6, to the client, the processes and methods of the present invention appear seamlessly provided by the MAN; however, while all MMC or essence resides with the MAN, including functional modules (604) for operations of BO Essence service, which calls the MMC or essence from the disk storage (605) associated with that MAN, including all MMC, for example image, documents, browse, copy, and thumbnails; quality control (QC), video analysis, media mover, and transcode, as illustrated. These media server (603) calls are controlled and authorized by the system via the GMH SOA server (622), which includes modules for order management services, BPO services, synchronous services, low level services (at MAN (604)), GDAM services, a controller layer, DAO and DAO layer, which accesses the metadata database (624) within GMH via the GMH-controlled BO web services (623). Note that the GMH-controlled BO web services (623) also controls access to the hi resolution tape storage (607) via front porch actors (606), both of which are within the MAN functionality.

Figure 7:
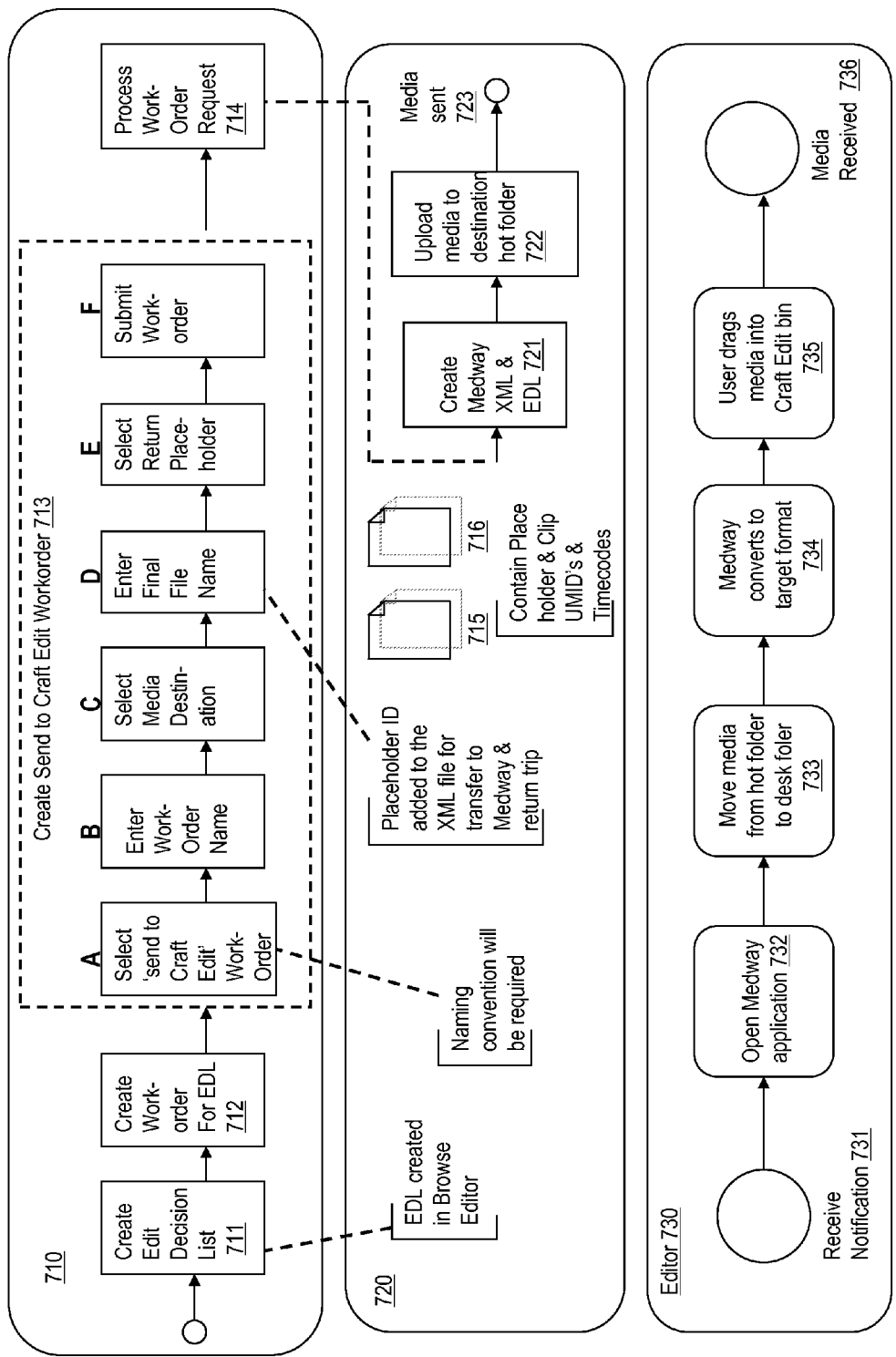
FIG. 7 is a flow diagram illustrating the processes of sending media to Craft Editor showing steps associated with creating the work order for processing by the system of the present invention.

FIG. 7 is a flow diagram illustrating the processes of sending media to Craft Editor, generally referenced (700) showing steps associated with creating the work order for processing by the system of the present invention. Method steps illustrated in the flow diagram of FIG. 7 show the arrangement of the system allowing editing of a browse copy of the MMC at a producer level (710), which may be operable outside the MAN, but in network-based coupling to the MAN servers for uploading media or MMC and its corresponding edit decision list (EDL) (711) created in browse editor and the sub-steps associated with the process of creating send to Craft Editor Workorder (713) culminating in a process workorder request (714), which necessarily requires a high resolution file (715) of the MMC and an XML file of metadata (716) corresponding to the MMC before the media is moved into the system level (720) including a step for creating medway XML and EDL, containing a placeholder and clip UMIDs and time-codes (721) and then the media is uploaded to a destination hot folder (722) and the "media sent" result (723) as shown at the middle level of the figure, between the producer and the editor levels on the top and bottom of the figure. At the Producer level the step of "process work order request" (714) for sending MMC to Craft Editor, requires the creation of a high resolution (hi res) file of the MMC and an XML file of metadata corresponding to the MMC, in order for the media to be sent and received into the system for inclusion as a media asset stored at the MAN. At the editor level (730) the steps of receive notification (731) moves the process forward via open medway application (732), move media or MMC to hot folder to destination folder (733), medway converts to target format (734), and then automatically allowing the user to drag the MMC into Craft Edit Bin (735), which concludes the process to allow the media or MMC to be received (736) for editing by the client.

Figure 8:
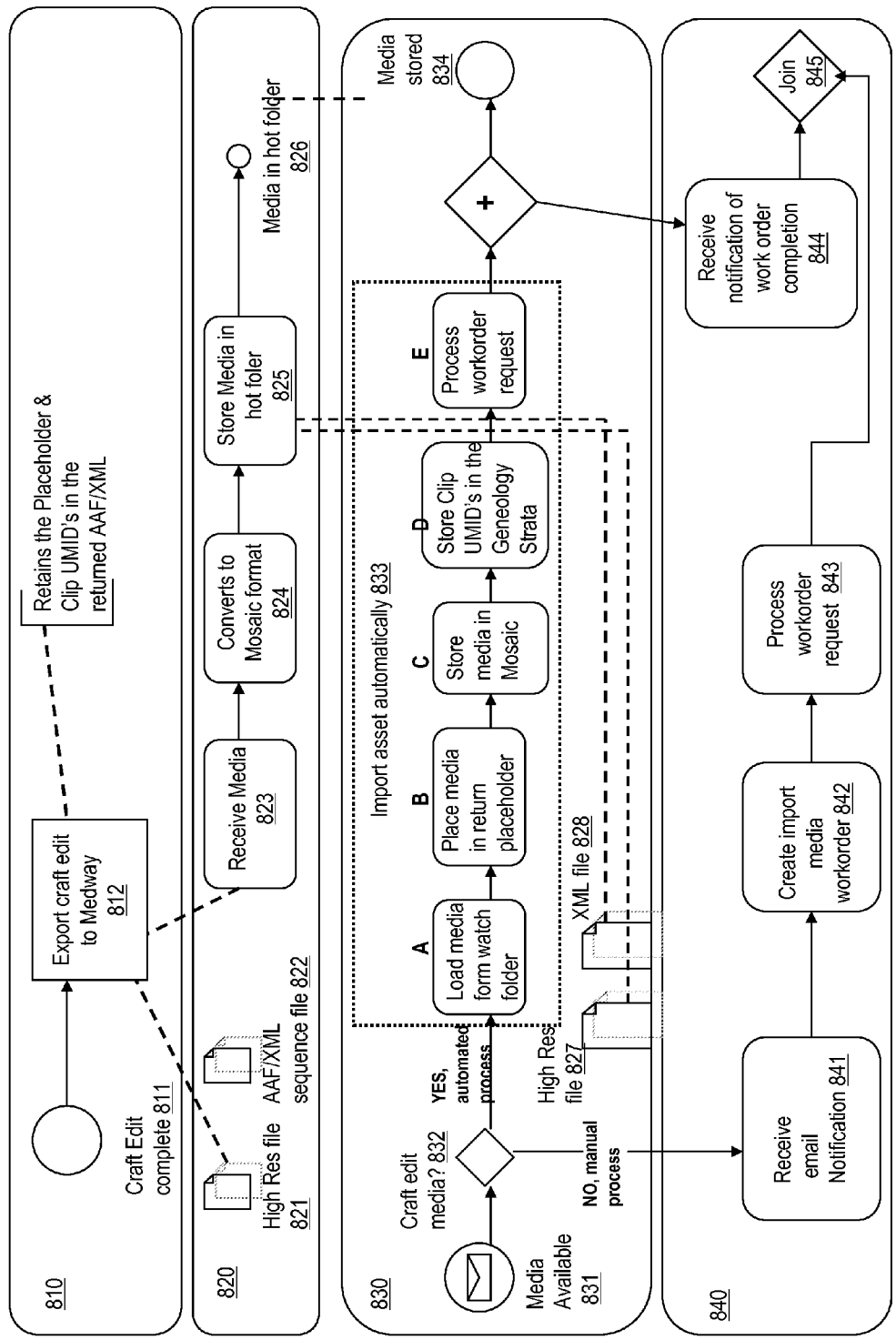
FIG. 8 is a flow diagram illustrating the processes of sending media from Craft Editor showing steps associated with automatically processing to import the media asset or content, or edited multimedia content (MMC) by the system of the present invention.

FIG. 8 is a flow diagram illustrating the processes of sending media from Craft Editor, generally referenced (800) showing steps associated with automatically processing to import the media asset or content from a production level (810), or edited multimedia content (MMC) by the system of the present invention, at the starting point of Craft Edit complete (811) and exporting craft edit to Medway (812) for storage at the MAN included at level Mosaic (830), which step (812) requires the creation of a hi res file (821) and corresponding AFF/XML sequence file (822); note that the exporting step (812) reclaims the placeholder and clip UMIDs in the returned AFF/XML. The Medway level (820) includes steps of receive media (823) converting to another format (824) preferred by the system at the next level (830) and stores media in hot folder (825), which requires the creation of the high resolution file (827) and XML file of metadata (828) for storage within the system at the MAN and GMH levels, respectively. This level processing ends with media in hot folder (826) and begins the next level (830) with media available at step (821). If it is MMC from Craft Edit media, a decision-based automated direction by the system at (832) routes to an automated process by the system of the present invention to Import asset automatically (833), including sub-steps to load media from watch folder (A) to place media in return placeholder (B) to store media at MAN in the system (C), storing clip UMIDs in the geneology strata (D) and process workflow request (E) ending with the media stored (834) and receive notification of work order completion (844) and join point result (845) at producer level (840). If the edited MMC is not Craft Edti media then at the producer level steps of receive email notification (841), create import media workorder (842) and process workorder request (843) result in the join point (845).

As set forth in this description, it is the MAN-based MMC that is acted upon for editing by the client, including its extraction of the browse copy from the MAN for editing outside, such as sending the MMC to Craft Editor through a workorder, as illustrated in FIG. 7; and then sending edited MMC from Craft Editor, illustrated in FIG. 8, wherein the edited MMC is uploaded to its destination in a hot folder and then received into the system for storage at the MAN, if and only if a corresponding metadata to the edited MMC is included with the edited MMC, so that the edited MMC metadata is received and stored centrally on the GMH. Thus, the separation of the MAN and the GMH advantageously provides flexibility of hosting the content-intensive operations at the MAN, which is closer to the client location than the GMH. The MAN is located typically either at or proximal to a client site, due to bandwidth requirements for transfer and/or management of the MMC.

Furthermore, the at least one remote server computer (MAN) includes a multiplicity of server computers in geographic distribution from the GMH, wherein at least one client computer terminal is coupled in electronic network communication to one of the MANs, and wherein the distance from any of the at least one client computer terminals to the MAN is less than the distance from those same terminals to the GMH server computer. Advantageously, this configuration of client terminals in closer proximity to the MANs than to the GMH provides for greatly improved editing speed, because preferred embodiments of the present invention provides for storage of a copy of the MMC at the MANs closest to the client terminals for editing that copy by the client terminal instead of having a much more remote communication distance between the client terminal and the GMH.

The GMH further includes a security exposure control module, business services modules, and a user interface module, that is viewable on a user interface of a remote display connected via a network, such as the Internet, and that provides for a multiplicity of interactive functionality on the GMH, including controlling all functionality of the system through the central GMH, including review and approval, library management, rough cut, logging, user administration, finding assets, searching, reporting view, view proxy, order receipt management, file ingest, publishing, dashboard, capture asset information, view asset information, workflow tracking, folders, clipping, and combinations thereof. Additionally, the systems and methods of the present invention provide for managing MMC by the MAN and their interaction with the GMH, wherein each MAN, which includes computer server(s) having a processing unit capable of executing instructions, either directly or received from a client or customer computer terminal via the client browser and web interface, and wherein the MAN further include a search module programmed and operable to searching for MMC by the client terminal. The MAN server computer-based storage modules include both disk storage (FIG. 6 at 605) and tape storage (607), and are further programmed to operate as a content center for the client web-based MMC editing activity, wherein that activity by the client terminal acting on the MMC is preferably acting on the local copy of the MMC stored at the MAN, and is not directly editing or acting on the GMH, or the metadata stored thereon. The MAN storage module closest to the client terminal provides for management of the client MMC within the MAN server computer, including any client activity on the client MMC (MMC imported from the GMH server computer for acting on by the client user at the client terminal), by way of example, allowing the client user to add, delete, view, annotate, comment on, modify, edit, organize, arrange, categorize, label, send, receive the MMC, components of MMC, and/or sub-components of MMC material (such as thumbnail representations or images of MMC); again, advantageously with the systems and methods of the present invention, it is this MAN-based MMC (or MMC copy or MMC proxy) having closest proximity to the client terminal (as compared with the GMH) that accelerates the processing of all MMC in the online, network, or web-based environment.

Additional processes that originate at the client terminal computer or MAN server computer directed at the MMC stored on the MANs include search, tracking, reporting, transcoding, translation, video-to-text representation, speech-to-text representation, etc. The client user can upload content to the system; user logs onto the MMC mover module, which resides in the GMH or in a MAN; it depends upon network connections, but preferably sitting within the GMH. Content is either provided physically to the MAN, or via logging onto a web-based browser, send selected content to a platform, and then ingested into the platform. Significantly, there is a prerequisite of metadata including an unique identifier corresponding to the MMC, to determine where to save it. The GMH controller functions will not allow content to be loaded unless the MMC or content further includes its unique ID metadata, which is created with the creation of new MMC, and persists indefinitely (stored at the GMH) for each original MMC, its subcomponents or sub-elements, and survives editing and repurposing for MMC or its subcomponents or sub-elements, if they are included in edited MMC that it reintroduced to the system at the MANs.

Methods of the present invention for editing multimedia content (MMC) and creating derivative works from multimedia content include the steps of: (a) providing at least one remote media asset node (MAN) having MAN server computer(s) that are associated with at least one client for editing a multimedia content (MMC), the at least one remote MAN constructed and configured in electronic communication over a network to a global media hub (GMH) including GMH server computer(s) having a processor, a memory, and software operable thereon to control the processes that act on the MMC stored at the MANs, and the GMH operable for storing metadata associated with the MMC and the GMH operable for controlling activities on the MMC at the MANs; (b) from a user interface on a display coupled to the at least one remote MAN associated with a client site and positioned in geographic proximity to the client site, acting on the MMC via a browser-based user interface (UI) at the client; (c) editing the MMC; and (d) introducing the edited MMC to the MANs with corresponding edited-MMC metadata to the GMH. Also, the method may further include the steps of: (d) the GMH storing metadata from the original MMC and the edited MMC metadata, and (e) the MAN storing the original MMC and the edited MMC. Additionally, the system further includes an original MMC, a browse copy MMC that is a lower resolution copy of the original MMC, and an edited MMC, and the MAN server computer is further operable to perform the following steps: (e) storing a copy of the original MMC, and an edited MMC; (f) providing an edit user interface (EUI) at a client terminal for communicating with the MAN for editing the original MMC to form the edited MMC; and (g) introducing edited-MMC metadata (metadata unique to the edited MMC) to the GMH for storage at the GMH.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A method for editing multimedia content and creating derivative works from multimedia content comprising the steps of:
   (a) providing a system including at least one remote media asset node (MAN) including MAN server computer(s) associated with at least one client for editing multimedia content (MMC), the at least one remote MAN constructed and configured in electronic communication over a network to a global media hub (GMH) having GMH server computer(s) having a processor, a memory, and software operable thereon to control the processes that act on the MMC at the MANs, the GMH operable for storing the metadata associated with the MMC, and the MANs operable for storing the MMC;

(b) from a user interface (UI) on a display coupled to the at least one remote MAN associated with a client site and positioned in geographic proximity to the client site, editing the MMC via the UI; and (c) the GMH controlling all workflows at the MANs.

2. The method of claim 1, the system further including an original MMC, a browse version MMC that is a copy of the original MMC, and an edited MMC, and wherein the MAN is further operable to perform the following steps: (d) storing the original MMC, the browse-version MMC, and the edited MMC; (e) an edit user interface (EUI) at a client terminal for communicating with the MAN server computer for editing the original MMC to form the edited MMC; and (f) introducing an edited-MMC metadata corresponding to the edited MMC, the metadata being stored at the GMH.

3. The method of claim 1, further including the steps of: (c) the GMH storing the metadata for the original MMC and metadata for the edited MMC.

4. The method of claim 1, wherein the metadata persists at the GMH for all MMC within the system.

5. A distributed system for editing multimedia content (MMC) comprising:

at least one remote MAN having MAN server computer(s) and associated with at least one client for editing MMC, the at least one remote MAN constructed and configured in electronic communication over a network to a global media hub (GMH) and GMH server computer(s) having software programs operable thereon to control all processes that act on the MMC at the MAN, and the GMH operable for centrally storing metadata associated with the MMC; and a user interface (UI) on a display at the client and coupled to the at least one remote MAN, the MAN being positioned in geographic proximity to the client and operable for acting on the MMC as controlled by the GMH for editing the MMC at the MAN.

6. The system of claim 5, wherein the UI resides at a client terminal coupled with the at least one MAN, and the UI controller resides at the GMH.

7. The system of claim 5, further including an original MMC, a browse copy MMC, and an edited MMC, all stored on the MAN, and wherein the MAN server computer is further operable to: execute workflow on the MMC as directed by the GMH.

8. The system of claim 5, wherein the at least one remote MAN includes a multiplicity of MAN server computers in geographic distribution from the GMH, wherein at least one client computer terminal is coupled in electronic network communication to one of the MANs, and wherein the distance from any of the at least one client computer terminals to the MAN is less than the distance from those same terminals to the GMH.

9. The system of claim 5, wherein the GMH server computer further includes modules for maintaining security, storing all metadata, controlling workflows for activities on the MMC at the MANs, and managing integration processes over the distributed network.

* * * * *